J. ERICKSON.
LUBRICATOR.
APPLICATION FILED DEC. 16, 1919.
1,382,490. Patented June 21, 1921.
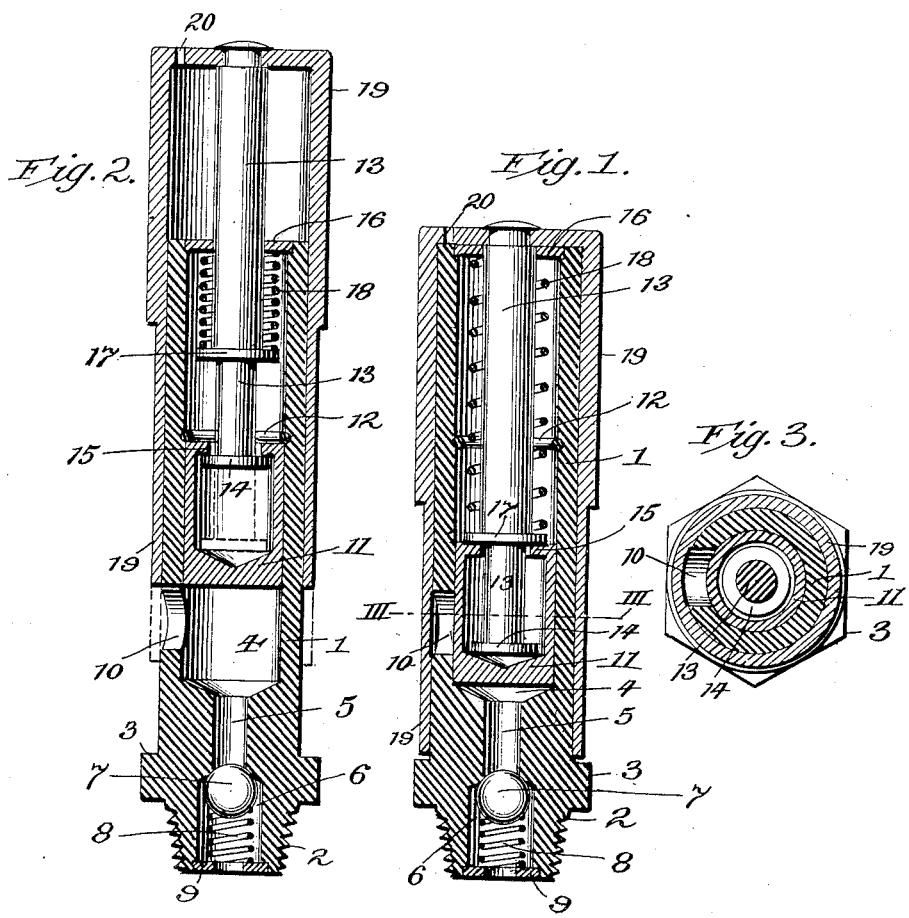

UNITED STATES PATENT OFFICE.

JOHN ERICKSON, OF MADISON, WISCONSIN, ASSIGNOR TO MADISON KIPP CORPORATION, OF MADISON, WISCONSIN, A CORPORATION OF WISCONSIN.

LUBRICATOR.

1,382,490.  Specification of Letters Patent.  Patented June 21, 1921.

Application filed December 16, 1919. Serial No. 345,203.

*To all whom it may concern:*

Be it known that I, JOHN ERICKSON, a citizen of the United States, residing at Madison, in the county of Dane and State of Wisconsin, have invented certain new and useful Improvements in Lubricators, of which the following is a specification.

This invention pertains to lubricators, and more particularly to those of the force feed type.

The main object of the invention is to produce a lubricator into which the lubricant may be readily introduced through an opening and to provide a cover for such opening which will be automatically closed prior to the coming into action of a force feed device or piston which causes the lubricant to pass to the part to be lubricated.

The structure is illustrated in the annexed drawings, wherein,—

Figure 1 is a vertical longitudinal sectional view with the parts in their normal or closed position;

Fig. 2 is a similar view with the parts so positioned that the lubricant may be introduced into the same preparatory to its being forced to the part to be lubricated; and Fig. 3 a transverse horizontal section taken on the line III—III of Fig. 1.

In said drawings, 1 denotes the main body of the structure, the lower end 2 of which is threaded for attachment to the part to be lubricated. Said body adjacent said threaded end is formed with a hexagonal or nut-shaped portion 3 to facilitate the securing of the structure in place. The body is circular in cross section and a cylindrical chamber 4 extends from the top thereof throughout its major portion, said chamber at its lower end opening into a somewhat smaller bore or passage 5. The lower end of the body is counterbored as at 6, and a valve 7 is placed therein and held to a seat formed at the lower end of the passage 5 by a spring 8. A perforate disk or washer 9 is secured in the lower end of the threaded extension 2 and maintains the spring in place, the spring being placed under a slight degree of compression to normally hold the valve closed. The lubricant is introduced into the cylinder through an opening 10 formed in the side wall thereof.

Mounted for reciprocation within the cylinder is a piston 11, said piston being hollow and having an opening formed centrally in its upper end. Upward movement of the piston is limited by a stop ring 12 formed of spring wire and sprung into a groove formed in the inner wall of the body. Extending into the upper end of the piston is an actuating rod or piston stem 13, the lower end whereof is provided with a head 14, the head being of such diameter that while it may have a free movement endwise within the piston it is prevented from being drawn out thereof by the inwardly projecting lip 15 formed on the piston. The piston rod 13 extends upwardly through a guiding washer 16 secured in the upper end of the body 1. Said rod has secured to it a washer 17, and a spring 18 encircling the stem and bearing at its opposite ends against the washers, acts to force the piston rod downwardly. Encircling the body and making a close sliding fit therewith is a sleeve-like closure member 19, the upper end whereof is fastened to the upper end of the rod 13, as by heading the reduced upper end thereof over the upper closed end of the sleeve. A small opening 20 is provided in the head of the sliding closure or sleeve 19 to permit the ingress and egress of air into and from the space between the sleeve and the upper end of body 1.

With the parts in the position shown in Fig. 1, the piston is down and the sleeve 19 closes the opening 10. When it is desired to introduce the lubricant the user will grasp the sleeve 19 and draw the same upward. During the first portion of the movement the rod 13 and its head 14 will move upwardly independent of the piston 11, and the spring 18 will be placed under partial compression. Continued movement will cause engagement of head 14 with lip 15 and the piston will be carried to the position shown in full lines in Fig. 2, the lower end of the sleeve likewise passing above the opening 10. Lubricant will then be introduced into opening 10 into the cylinder and beneath the piston. Upon release of the sleeve, spring 18 will force the sleeve and rod 13 downwardly, the sleeve closing the opening 10 and the head 14 coming into contact with the piston 11 (see dotted lines, Fig. 2) and upon continued downward movement of said sleeve and rod either through the action of spring 18 or force applied manually to the sleeve the piston will be moved downwardly in the cylinder forcing the lubricant therefrom past the valve 7 to the part to be lubricated. It will thus be seen that the piston has a lost motion connection with reference to the rod and the sleeve for closing the feed port or opening 10 and that the piston does not come into operation until said opening is closed. Inasmuch as the sleeve or closure makes a close fit with the body 1 the lubricant cannot pass outwardly through the opening 10 but is constrained to unseat valve 7 and pass to the part to be lubricated.

The structure is especially adapted for use upon automobiles or motors and as will be readily appreciated may be employed in any position.

What is claimed is:

1. In a lubricator, the combination of a cylinder having a feed and a discharge port; a piston mounted therein; a closure member for the feed port mounted on the body; and a piston rod attached to and movable with said closure member, said rod likewise having a lost motion connection with the piston, whereby the closure member may first move lengthwise of the cylinder to close the feed port and the rod at the same time likewise moved without actuating the piston.

2. In a lubricator, the combination of a cylinder having a lateral feed opening and a discharge opening; a piston mounted within said cylinder; a sleeve mounted exteriorly of the piston and adapted to close the feed opening; a post or rod connected at one end to said sleeve; a lost motion connection between the other end of the rod and the piston; and a spring acting to force the rod and sleeve downwardly.

3. In a lubricator, the combination of a cylinder having a lateral feed opening and a discharge port at its lower end; a sleeve slidably mounted on the exterior of said cylinder and adapted to close the feed opening; a piston mounted in the cylinder; a piston rod connected at one end to the upper portion of the sleeve; a lost motion connection between the piston and the inner end of the rod; and a spring located within the cylinder above the piston said spring acting to force the rod and sleeve downwardly with reference to the piston and likewise to cause the piston to move inwardly when the sleeve has closed the feed opening.

4. In a lubricator, the combination of a cylindrical body portion having a lateral feed opening and a discharge port at its lower end; a hollow piston mounted therein; a piston rod mounted in the upper portion of the body with its upper end extending above the same and its lower end extending into the hollow piston; a head on said lower end; an inwardly extending lip on the upper end of the piston preventing withdrawal of the head from the piston while permitting relative movement between said rod and piston; a spring acting to force the rod downwardly; and a sleeve mounted to slide on the outer face of the cylinder, said sleeve being attached to the upper end of the piston rod and movable therewith.

5. In a lubricator, the combination of a cylindrical body portion having a lateral feed opening and a discharge port at its lower end; a hollow piston mounted therein; a stop ring mounted in the body above the piston and serving to limit the upward movement of the piston; a piston rod mounted in the upper portion of the body with its upper end extending above the same and its lower end extending into the hollow piston; a head on said lower end; an inwardly extending lip on the upper end of the piston preventing withdrawal of the head from the piston while permitting relative movement between said rod and piston; a spring acting to force the rod downwardly; and a sleeve mounted to slide on the outer face of the cylinder, said sleeve being attached to the upper end of the piston rod and movable therewith.

In testimony whereof I have signed my name to this specification.

JOHN ERICKSON.